March 15, 1932.  R. H. CARSON  1,849,906
VALVE DEVICE
Filed April 24, 1929   2 Sheets-Sheet 1

Witness:
William P. Kilroy

Inventor:
Robert H. Carson
Hill & Hill

March 15, 1932.  R. H. CARSON  1,849,906

VALVE DEVICE

Filed April 24, 1929  2 Sheets-Sheet 2

Witness:
William R. Kilroy

Inventor:
Robert H. Carson
Hill & Hill
Attys

Patented Mar. 15, 1932                                                    1,849,906

UNITED STATES PATENT OFFICE

ROBERT H. CARSON, OF CHICAGO, ILLINOIS, ASSIGNOR TO JAS. P. MARSH & COMPANY, OF CHICAGO, ILLINOIS, A CORPORATION OF ILLINOIS

VALVE DEVICE

Application filed April 24, 1829. Serial No. 357,798.

My invention relates to valve devices and more particularly it relates to direct control valves which, among other uses, are adapted for controlling heating devices such as dryers and steam or hot water radiators used in heating dwellings, offices, and the like.

The thermostatic control of the flow of heating fluid from a source of supply to radiators or other heating or drying appliances is well known to those familiar with the art. Such control has generally been accomplished by providing a centrally located thermostatic appliance which necessarily operates to shut off the flow of the heating fluid in accordance with the temperature in the room or space immediately surrounding the thermostat.

One of the objects of the invention is to provide a device adapted to maintain any desired constant predetermined temperature within the room or space being heated, the device being adjustable for control over a large range of temperatures.

Another object of the invention is to provide an improved individual thermostatic control which is operable to open and close a valve of a radiator unit or the like upon which it is mounted.

A further object of the invention is the provision of an improved direct control valve which is operable to be opened and closed in accordance with the temperature in the room or space in which the valve is located.

A further object of applicant's invention is the production of a device which is compact, simple, convenient, durable, efficient, and satisfactory for use wherever found applicable.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Figure 1:
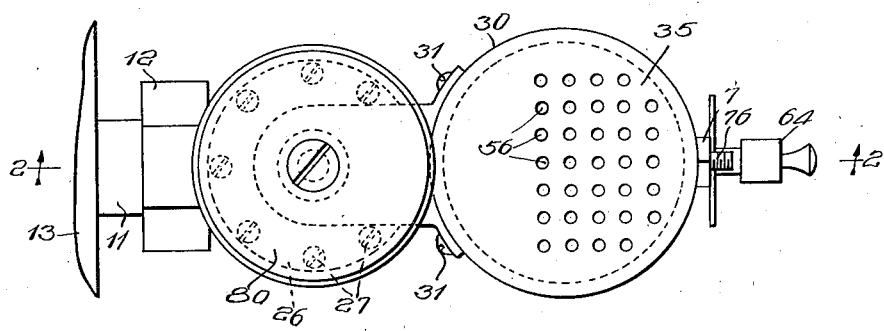
Fig. 1 is a plan view of the device.

Referring to the drawings, the numeral 10 generally indicates a valve casing which is attached to the radiator unit 13 by means of a connector 11 and union nut 12.

A supply pipe 14 connects the radiator unit 13 through the valve casing 10. The pipe 14 and a connector 15 form a fluid supply line operable to convey heating fluid from a source of supply (not shown) to the radiator unit 13. A boss or plug 16 extends laterally from the connector 15 for a purpose hereinafter more particularly described.

The flow of fluid through the pipe 14 is controlled by a valve 18 which is adapted to be either manually or automatically actuated to open and closed positions. A valve seat 17 is located immediately below the valve 18 so that a limited amount of vertical movement of the valve operates to seat the valve disk 19 thereon. The valve disk 19 is fastened to the valve 18 by means of a nut 20. A cag or sleeve 21 is threaded into the upper portion of the valve casing 10 to provide a runway for an open ended diaphragm 23 of the sylphon type. The diaphragm 23 has a brazed or other suitable fluid tight connection with the valve 18 at its lower end and is provided at its upper end with a flange 24 by means of which the diaphragm is clamped in position between outwardly turned flanges 25 and 26 respectively of the cage 21 and a cover 22.

Bolts 27 are provided to fasten the cover 22 to the cage 21. The flange 24 of the diaphragm 23 is clamped between the flanges 25 and 26 and holds the upper end of the diaphram against longitudinal movement. The end fastenings of the diaphragm 23 thereby provide a packless valve connection which is fluid tight.

Controlling mechanism adapted to automatically actuate the valve 18 is located in a housing 30. The housing 30 is a generally cylindrical shaped member preferably constructed of material having non-conductive heat properties. The housing 30 is connected to the cover 22 by bolts 31 and to the lower portion of the valve casing 10 by bolts 32. A cover 35 is provided for the housing 30 whereby access is had to the interior of the housing for the purpose of repairing, adjustment, and replacement of the various control members contained therein.

A diaphragm 37 of the sylphon type is positioned at substantially the middle portion of the housing 30 and is supported by a U-shaped swing member or yoke 33. The yoke 33 has its upper end portions 34 turned outwardly to provide pivotal mountings in bearings 36. The diaphragm 37 is fastened to the bottom portion of the yoke 33.

The diaphragm 37 contains volatile fluid adapted to cause its expansion and contraction under changes of temperature. A tubular member 38 projects downwardly from and has its upper end opening into the diaphragm 37. The lower end portion of the member 38 is preferably rectangular and offset so that its vertical end face is normally in close proximity to the end of the boss 16. The boss 16 is provided for convenience and could be dispensed with by extending the bottom end of the member 38 laterally so as to normally rest in close proximity to the pipe 14 or the connector 15 or any other member forming a portion of the line carrying the heating fluid to the valve casing. A mounting post 40 is positioned interiorly of the diaphragm 37. The post 40 has a threaded connection at its lower end with the bottom of the diaphragm and extends upwardly to form a junction with an extension post 41. The post 41 projects through the upper end wall of the diaphragm 37. The upper end of the post 40 is provided with a stem 45 which engages a socket 42 in the lower end of the post 41. The post 41 moves vertically with the expansion and contraction of the free end of the diaphragm 37. The socket 42 and stem 45 are of sufficient depth and length respectively to provide a connection between the posts 40 and 41 during such vertical movement.

The diaphragm 37 is operatively connected with the valve 18 by a fulcrum arm 52 which is pivotally mounted near its mid-portion upon a pin 54. The arm 52 extends through registering apertures 96 which are formed in the walls of the cover 22 and the casing 30. One end of the arm 52 is pivotally connected to a vertically extending bifurcated rod 47 by means of a pin 53 and the other end of the horizontal arm 52 is pivotally connected to a vertical rod 51 by means of a pin 55. A shouldered nut 48 is threaded onto the lower end of the rod 47 and a corresponding shouldered nut 46 is threaded onto the projecting upper end of the post 41. A stem 44 projects from the bifurcated rod 47 downwardly into a socket 43 provided in the upper end of the post 41. The pin 54 is carried by a bifurcated member 54a which is swivelled to the lower end of a screw 54b screw threaded through the cover 22.

A compression spring 49 has its upper end secured to the shouldered nut 48, and its lower end secured to the nut 46. The vertical rod 51 has a ball and socket connection with the valve 18. This connection permits the valve 18 to travel in a vertical path notwithstanding the slight rocking of the rod 51 during its vertical movement, occasioned by the pivoting of the horizontal arm 52 about the rod 54 as a fulcrum.

It is obvious that expansion of the diaphragm 37 will tilt the horizontal arm 52 so as to force the rod 51 and the valve 18 downwardly and that contraction of the diaphragm 37 similarly operates to lift the valve 18 from its seat 17. The spring 49 provides the necessary resiliency to permit continued expansion of the diaphragm 37 after the valve 18 has been seated.

Figure 2:
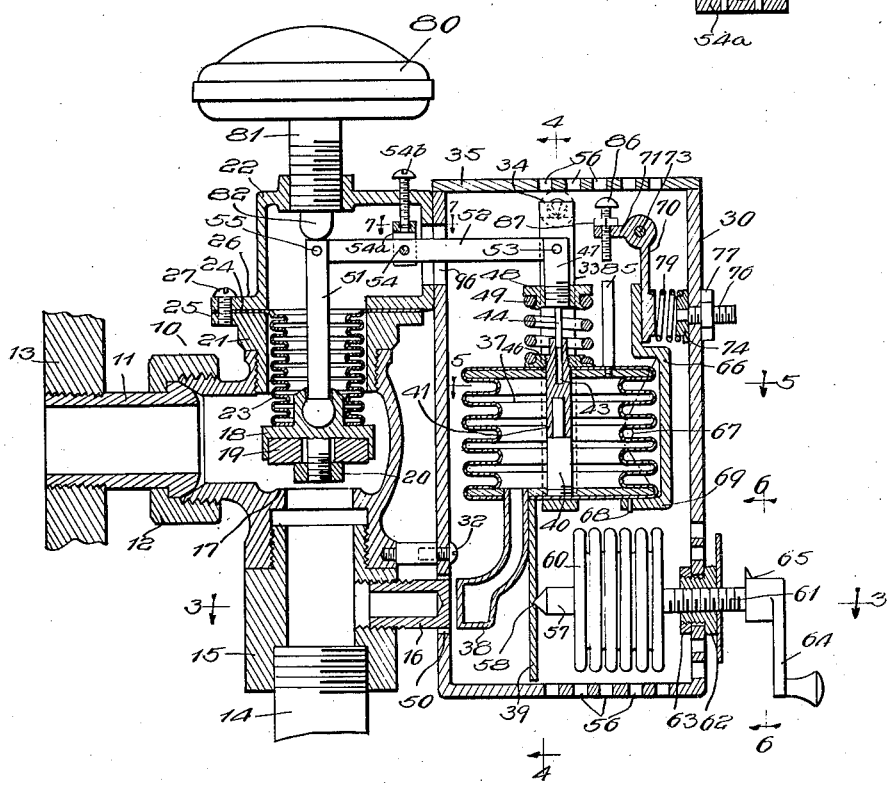
Fig. 2 is a sectional view along the line 2—2 of Fig. 1.
Figure 7:
Fig. 7 is an enlarged section on line 7—7 of Fig. 2.
Figure 3:
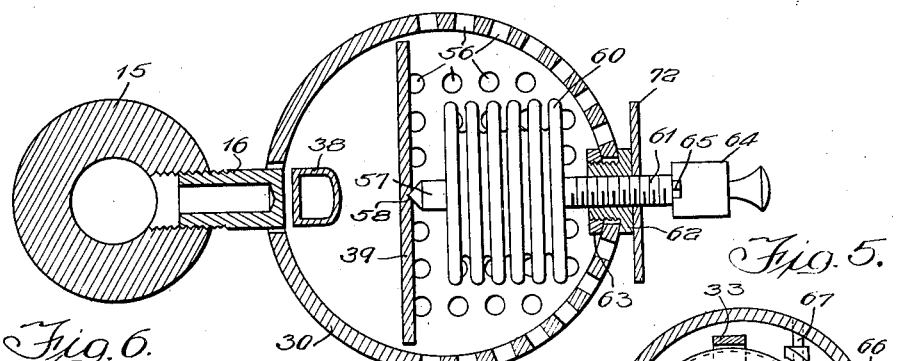
Fig. 3 is a view along the line 3—3 of Fig. 2.
Figure 5:
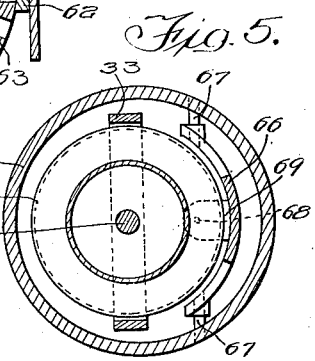
Fig. 5 is a view along the line 5—5 of Fig. 2.

The volatile fluid contained in the diaphragm 37 is of a quality adapted to cause the sylphon to remain in the full line position indicated in Fig. 2 for predetermined normal room temperatures, in which position the valve 18 is open. The diaphragm 37 is adjusted to expand only when subjected to a substantially higher temperature than such normal temperature and this excess temperature is provided by bringing the member 38 into contact with the boss 16 which is constantly filled with hot fluid regardless of whether the valve 18 is open or closed. When the member 38 is brought into contact with the heated boss 16, the volatile fluid with which the diaphragm 37 and the member 38 are filled, will rapidly expand and force the valve 18 to its closed position, which position the valve will maintain while the member 38 and the boss 16 are in contact.

In the lower portion of the housing 30 I have provided a highly sensitive diaphragm 60 which is operable by its expansion to move the member 38 into contact with the boss 16 when the room temperature rises slightly above the predetermined normal. Contraction of the diaphragm 60 likewise permits the separation of the member 38 from the boss 16 when the room temperature falls below said predetermined normal.

A plurality of apertures 56 are provided in the end and side walls of the housing 30 to permit the circulation of air at the room temperature about the diaphragm 60. The diaphragm 60 is unaffected by its proximity to the heated pipe 14 and radiator unit 13 by reason of the housing 30 being constructed of relatively non-conducting material. A vertical baffle plate 39 is positioned between the member 38 and the free end of the diaphragm 60 to shut off the heat which normally would be radiated from the heated boss 16 and the member 38.

A threaded shaft 61 is mounted in the vertical side wall of the housing 30. The inner end of the shaft 61 has a swivelled connection (not shown) with the fixed end of the diaphragm 60. A pin 57 is mounted on the movable end of the diaphragm 60 preferably in axial alignment with the shaft 61. The pin 57 has its projecting free end pointed for engagement with a socket 58 formed in the plate 39, the pin 57 and the shaft 61 together forming a support for the diaphragm 60. The shaft 61 is mounted in a shouldered ring 62. The ring 62 is held in position in the side wall of the housing 30 by a nut 63. The shaft 61 has a threaded connection with the ring 63 whereby rotation of the shaft operates to move the diaphragm 60 inwardly or outwardly. A crank 64 is mounted on the extreme outer end of the shaft 61 for use in adjusting and calibrating the device.

The diaphragm 60 having been calibrated to any desired normal room temperature in a manner hereinafter more particularly described, any slight excess of room temperature will expand the diaphragm. The expanding diaphragm 60 will thrust the plate 39 to the left, as observed in Fig. 2, thereby swinging the diaphragm 37 and its supporting yoke 33 to the left until the tubular member 38 contacts with the boss 16. This contact of the member 38 and the boss 16 rapidly heats the volatile fluid contained in the member 38 and the diaphragm 37 and causes the immediate closure of the valve 18 as hereinbefore described. When the room temperature drops slightly below the predetermined normal as a result of the closing of the valve 18, the sensitive diaphragm 60 will immediately contract and permit the member 38 and the diaphragm 37 to swing back to their normal vertical positions, thereby disconnecting the member 38 from the heated boss 16. In this disconnected position of the member 38 and the boss 16, the diaphragm 37 rapidly cools and contracts, thereby opening the valve 18 and again permitting the entrance of heating fluid to the radiator unit 13.

Figure 6:
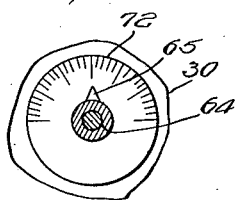
Fig. 6 is a fragmentary elevational view along the line 6—6 of Fig. 2.
Figure 4:
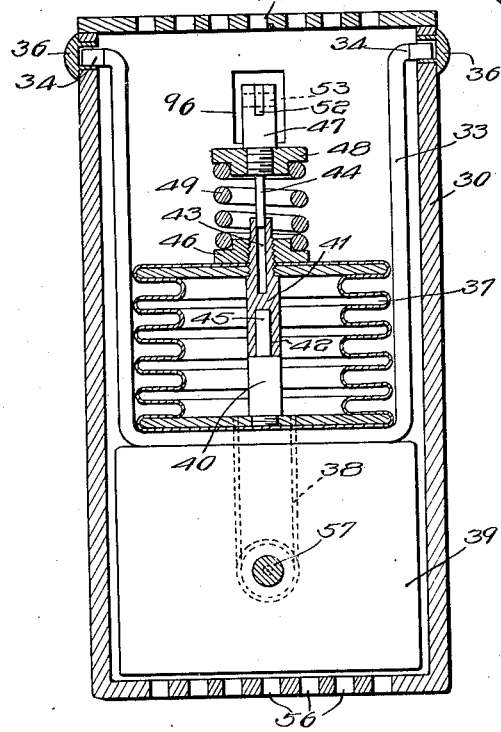
Fig. 4 is a view along the line 4—4 of Fig. 2.

For the purpose of calibrating and adjusting the diaphragm 60 I have provided a dial plate 72 which is best shown in Fig. 6 and is mounted on the side wall of the housing 30. A pointer 65, preferably mounted upon the crank 64, suitably indicates the critical room temperature at which the diaphragm 60 is set to expand and cause the valve 18 to close. A spring 79 is mounted on the interior of the housing 30 and near the upper portion thereof. The resistance of the spring 79 is varied by means of a bolt 76. Suitable adjustment of the spring 79 in combination with rotation of the shaft 61 accomplishes the complete calibration of the control device as follows: A rock member 66 is pivotally mounted in the side walls of the housing 30 on a pair of oppositely positioned pins 67. The lower end portion 69 of the member 66 is turned inwardly into substantial contact with the bottom of the diaphragm 37 and operatively engages a pin 68 mounted on the bottom of the diaphragm. Any movement of the rock member 66 will thereby correspondingly move the diaphragm 37. The upper end of the rock member 66 has sliding engagement with a lever 70. The spring 79 has one end bearing against the lower end of the lever 70 and its other end in engagement with the shouldered washer 74. The bolt 76 has a swivelled connection with the shouldered washer 74 and may be locked in any desired position by a nut 77. By threading the bolt 76 inwardly, the washer 74 is likewise moved inwardly compressing the spring 79 and forcing the lever 70 against the upper end of the member 66. The pressure of the lever 70 against the upper end of the member 66 tends to rotate the member in counter clockwise direction about the pins 67 and to pull the bottom end of the diaphragm 37 to the right, as observed in Fig. 2. The diaphragm 37 in moving to the right contracts the diaphragm 60 by pressure of the plate 39 exerted on the pin 57. The sylphon 60 can thus be calibrated to operate at any desired temperature to move the member 38 into contact with the boss 16 by manipulating the bolt 76 and the shaft 61.

In the event of continued high temperature after the valve 18 is closed, the member 38 will remain in contact with the boss 16 and the diaphragm 37 will continue to expand until a post 85, on the upper wall of the diaphragm contacts with a screw bolt 86. The bolt 86 is adjustably mounted on an arm 71. The arm 71 is integral with the lever 70, the arm and lever together functioning as a bell crank pivotally mounted on a rod 73. The bolt 86 may be locked in any desired position by means of a nut 87. Any undue or prolonged exposure of the diaphragm 37 to heat from the boss 16 operates to bring the post 85 into end contact with the screw bolt 86, thereby rotating the lever 70 in a clockwise direction about the rod 73. This contact of the post 85 with the screw bolt 86 and the resulting clockwise movement of the lever 70 operates to rotate the rock member 66 in a counter clockwise direction about its pin supports 67. The counter clockwise rotation of the rock member 66 causes the diaphragm 37 and the yoke 33 to swing to the right as observed in Fig. 2.

This tendency of the diaphragm 37 to swing to the right is retarded by contact of the baffle plate 39 with the pin 57. The pull exerted by the bottom portion of the rock member 66 on the pin 68 continues, however, and operates to swing the member 38 clear of the boss 16. The diaphragm 37, as a result, begins to cool and contract and thereby permits the lever 70 and the member 66 to assume their normal positions. The diaphragm 37 also takes its normal vertical position, which position it retains until the diaphragm 60 is again expanded by rising temperature of the room.

The valve 18 may also be opened and closed manually by turning a wheel 80. The wheel 80 is mounted on a threaded stem 81. The combined resiliency of the spring 49, the sylphon 37, and the sylphon 23 operate to hold the vertical rod 51 in contact with a boss 82 mounted on the lower end of the valve stem 81. Turning the valve stem 81 downwardly by means of the wheel 80 operates to similarly move the valve 18 to its seated position, against the combined resiliency of the sylphons 23 and 37 and the spring 49. The valve 18 may be opened manually by the reverse operation, the boss 82 being moved upwardly to permit the valve to be lifted under the combined pull of the sylphons 23 and 37.

The improved valve may be adjusted with respect to the particular conditions under which it is to operate, thus, in some instances, the valve is required to operate in a system which is operated practically continuously under sub-atmospheric pressures and in other instances, the valve is utilized in systems wherein atmospheric pressure or pressure higher than atmospheric pressure generally obtains. It is for this purpose that the pin 54 which pivots the lever 52 is mounted in the bifurcated member 54a, the member 54a being swiveled to the lower end of the screw 54b. With this construction, it is obvious that the lever 52 and the rods 51 and 47 may be raised or lowered as a unit. Thus, when the valve is employed in a system wherein sub-atmospheric pressures are the rule, I preferably manipulate the screw 54b to raise the lever 52 and the rods 51 and 47 so that the diaphragm 37 may be tensioned and the valve disk 19 will be displaced away from the valve seat 17. When the valve is adjusted in this manner, the valve remains open for a longer time after the volatile fluid in the diaphragm 37 expands than it does when the screw 54b has been manipulated to lower the lever 52 and the rods 51 and 47. In this manner, I am sure that sufficient steam will be supplied to the radiator and the valve will not close prematurely when operating under a relatively high vacuum. Of course, when the valve is adjusted for a system operating at atmospheric pressure or a pressure higher than atmospheric pressure, the lever 52 and the rods 51 and 47 are lowered so that the diaphragm 37 is not tensioned and the valve disk 19 approaches its seat 17. As described above, the spring 49 has its ends attached to the nuts 46 and 48 so that upward displacement of the rod 47 will be accompanied by like displacement of the upper end of the diaphragm 37.

Having thus described my invention, it is obvious that various immaterial modifications may be made in the same without departing from the spirit of my invention, hence, I do not wish to be understood as limiting myself to the exact form, construction, arrangement and combination of parts herein shown and described or uses mentioned.

What I claim as new and desire to secure by Letters Patent is:

1. The combination with a heating unit positioned to heat a room or other space, of a source of heating fluid, a supply line connecting the radiator unit with said source of heating fluid, a valve operable to control the flow of fluid through said line, a diaphragm operable to open and close the valve in accordance with the resultant contraction and expansion occasioned by changes of temperature to which the diaphragm is subjected, a hollow contact member communicating with said diaphragm, a swing mounting for said diaphragm and member, and a second diaphragm operable by slight fluctuations of the room temperature above and below a predetermined point to cause said member to swing into and out of contact with said supply line.

2. The combination with a heating unit positioned to heat a room or other space, of a source of heating fluid, a supply line connecting the radiator unit with said source of heating fluid, a valve operable to control the flow of fluid through said line, a diaphragm operable to open and close the valve in accordance with the resultant contraction and expansion occasioned by changes of temperature to which the diaphragm is subjected, a contact member communicating with said diaphragm, a swing mounting for said diaphragm and member, a second diaphragm operable by slight fluctuations of the room temperature above and below a predetermined point to cause said member to swing into and out of contact with said supply line, and means carried by said first mentioned diaphragm and member for insulating said second mentioned diaphragm from the direct heating effect of said line.

3. The combination with a heating unit located in a room and having a supply line connection with a source of heating fluid, of a valve operable to control the flow of fluid through said line, a diaphragm operable to open and close the valve, a hollow tubular member communicating with said diaphragm, means for adjusting the diaphragm to change the range of temperature through which said diaphragm is active, a swing mounting for said diaphragm and member, a second diaphragm operable by slight fluctuations of the room temperature above and below a predetermined normal to cause said member to swing into and out of contact with said supply line, and means for calibrating said second diaphragm to vary the temperatures at which it operates to control the swinging of said first mentioned diaphragm.

4. The combination with a heating unit located in a room and having a supply line connection with a source of heating fluid, of a valve operable to control the flow of fluid through said line, a diaphragm operatively connected with the valve to open and close the valve in accordance with its contraction and expansion occasioned by changes of temperature to which the diaphragm is subjected, a contact member associated with said diaphragm, a swing mounting adapting said member to be moved into and out of contact with said supply line, a second diaphragm operable upon a slight drop of the room temperature below a predetermined normal to swing said member into contact with said supply line, and means operable by continued expansion of the first mentioned member to move said diaphragm out of contact with said line independently of the second mentioned diaphragm.

5. The combination with a fluid supply line connected to a source of heating fluid of a valve operable to control the flow of fluid through the line, a diaphragm having a portion associated therewith adapted to be moved into and out of physical contact with said line, said diaphragm when said portion is in contact with said line operating to close said valve and when out of contact with the line operating to open the valve, thermostatic means operable upon slight fluctuations of temperature above and below a predetermined normal, to move said portion into and out of contact with said line, and means operable by expansion of the diaphragm, resulting from said contact with said line, to move the portions out of contact with the line independently of said thermostatic means.

6. The combination with a fluid supply line connected to a source of heating fluid of a valve operable to control the flow of fluid through the line, a diaphragm having a portion adapted to be moved into and out of physical contact with said line, said diaphragm when said portion is in contact with said line operating to close said valve and when out of contact with the line operating to open the valve, thermostatic means operable upon being subjected to slight fluctuations of temperature above and below a predetermined normal, to move said portion into and out of contact with the line, means operable by expansion of the diaphragm resulting from contact with said line, to move the portion out of contact with the line independently of said thermostatic means, and manually actuated means operable to open and close the valve independently of said diaphragm control.

7. The combination with a heating unit located in a room and having a supply line connection with a source of heating fluid, of a valve operable to control the flow of fluid through said line, a diaphragm operatively connected with the valve to open and close the valve in accordance with the contraction and expansion occasioned by changes of temperature to which the diaphragm is subjected, a hollow tubular member associated with said diaphragm, a swing mounting for said diaphragm, a second diaphragm operable by slight fluctuations of the room temperatures above and below a predetermined normal to cause said member to swing into and out of contact with said supply line, and means operatively related to said second diaphragm for calibrating the first mentioned diaphragm to change the range of temperature through which said first mentioned diaphragm is active.

In witness whereof, I hereunto subscribe my name this 16th day of April, A. D. 1929.

ROBERT H. CARSON.